United States Patent
Wu et al.

(10) Patent No.: US 8,508,311 B2
(45) Date of Patent: Aug. 13, 2013

(54) TRANSMISSION LINE AND ELECTRICAL APPARATUS USING THE SAME

(75) Inventors: Tzong-Lin Wu, Taipei (TW); Hao-Hsiang Chuang, Kinmen County (TW); Yu-Ren Cheng, New Taipei (TW)

(73) Assignee: National Taiwan University, Taipei (TW)

( * ) Notice: Subject to any disclaimer, the term of this patent is extended or adjusted under 35 U.S.C. 154(b) by 40 days.

(21) Appl. No.: 13/272,290

(22) Filed: Oct. 13, 2011

(65) Prior Publication Data

US 2013/0038413 A1    Feb. 14, 2013

(30) Foreign Application Priority Data

Aug. 12, 2011  (TW) ............................. 100128957 A (51) Int. Cl.
  *H03H 7/38*  (2006.01)
  *H01P 5/02*  (2006.01)
  *H04B 3/14*  (2006.01)

(52) U.S. Cl.
  USPC .......................................... 333/28 R; 333/33

(58) Field of Classification Search
  USPC ............... 333/33, 34, 35, 32, 238, 246, 28 R, 333/18
  See application file for complete search history.

(56) References Cited

U.S. PATENT DOCUMENTS
2006/0103482 A1 *  5/2006  Hettak .............................. 333/33

* cited by examiner

*Primary Examiner* — Stephen Jones
(74) *Attorney, Agent, or Firm* — Rosenberg, Klein & Lee (57) ABSTRACT

A transmission line with a structure which is capable of forming a passive equalizer and an electrical apparatus using the same are illustrated. The transmission line has a substrate, a ground plane, a defect ground structure, a pair of transmission conducting lines, and at least one stub. The substrate has a plurality of surfaces. The ground plane is located on at least one of the surfaces. The defect ground structure is formed on the ground plane. The pair of transmission conducting lines is located on one of the surfaces, and stretching over the defect ground structure. The at least one stub is located above a plane of the defect ground structure, extending along with at least one side of two sides of the pair of the transmission conducting lines, and electrically coupled to the pair of the transmission conducting lines and the ground plane.

20 Claims, 11 Drawing Sheets

TRANSMISSION LINE AND ELECTRICAL APPARATUS USING THE SAME

BACKGROUND

1. Technical Field

The present disclosure relates to a transmission line, and more particularly to a transmission line with a structure which is capable of forming a passive equalizer, and the electrical apparatus using the same.

2. Description of Related Art

To continuously integrate several commercial electrical products and improve the performance of the integrated electrical apparatus, the issue for increasing the speed of the signal transmission between chips becomes important to the electrical product manufacturers. In the different signal transmission mediums, the differential signal lines have the low crosstalk and electromagnetic radiation, therefore widely being applied to the high speed signal transmission. However, when the practical circuit layout is considered, the layout of the differential signal lines are usually designed to match the other circuit, such that the ideal layout of the differential signal lines is forced to be affected by the non-continuous structure. Hence, the common mode noise is generated, and the transmission quality of the differential mode signal is decreased.

When the common mode noise is excited and propagated in the printed circuit board, the common mode noise tends to radiate through the analogous antenna structure of the printed circuit board, such that the ElectroMagnetic Interference (EMI) is generated to affect the differential mode signal transmitted in the differential signal lines. The differential mode signal may further affected by the non-ideal characteristics of the structure or/and the material of the differential signal lines (such as the attenuation of the medium or the metal), and thus the transmission quality of the differential mode signal is decreased. The various effects mentioned above may severely decrease the quality of the eye pattern at the receiving end of the differential signal lines, and further cause the erroneous logic decision when the back-end chip reads the differential signal.

Currently, several methods are provided to suppress the common mode noise and improve the eye patter of the differential mode signal. For example, the designs of the transmission line implemented by the common mode choke coil, the low temperature cofired ceramics common mode filter, and the slotted ground plane filter are proposed, and that the designs are capable of suppressing the common mode noise is proofed. In addition, the transmission line being designed to incorporate with the active equalizer is proposed, and the transmission line has the better performance. However, the active equalizer needs the extra power consumption and chip area, and therefore the manufacturing cost of the transmission line is increased, and the manufactured electrical apparatus adopting the transmission line cannot have the low power consumption and the slim and thin dimension.

SUMMARY

An exemplary embodiment of the present disclosure provides a transmission line with a structure which is capable of forming a passive equalizer, so as to suppress a common mode noise and improve a transmission quality of the differential mode signal. The transmission line comprises a substrate, a ground plane, a defect ground structure, a pair of transmission conducting lines, and at least one stub. The substrate has a plurality of surfaces. The ground plane is located on at least one of the surfaces. The defect ground structure is formed on the ground plane. The pair of transmission conducting lines is located on one of the surfaces, and stretching over the defect ground structure. The at least one stub is located above a plane of the defect ground structure, extending along with at least one side of two sides of the pair of the transmission conducting lines, and electrically coupled to the pair of the transmission conducting lines and the ground plane.

An exemplary embodiment of the present disclosure provides a transmission line comprising a passive equalizer. The passive equalizer receives and transmits a first signal and a second signal. The passive equalizer is operating in a first operation mode for a differential mode signal of the first signal and the second signal, so as to improve a transmission quality of the differential mode signal. The passive equalizer is operating in a second operation mode for a common mode signal of the first signal and the second signal, so as to filter a common mode noise.

An exemplary embodiment of the present disclosure provides an electrical apparatus comprising a plurality of electrical components and at least one transmission line. The transmission line is for electrically connecting at least one of the electrical components.

The transmission line provided by the exemplary embodiment of the present disclosure has a structure which is capable of forming a passive equalizer, wherein the passive equalizer is capable of suppressing the common mode noise and improving the transmission quality of the differential mode signal. Compared to the conventional transmission line being designed to incorporate with the active equalizer, the transmission line provided by the exemplary embodiment of the present disclosure has the good transmission quality of the differential mode signal without having the extra power consumption and chip area. Hence, the manufactured electrical apparatus adopting the transmission line provided by the exemplary embodiment of the present disclosure has the low manufacturing cost, the low power consumption, and the slim and thin dimension.

In order to further understand the techniques, means and effects the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Reference will now be made in detail to the exemplary embodiments of the present disclosure, examples of which are illustrated in the accompanying drawings. Wherever possible, the same reference numbers are used in the drawings and the description to refer to the same or like parts.

An exemplary embodiment of the present disclosure provides a transmission line with a structure which is capable of forming a passive equalizer. The passive equalizer is able to suppress a common mode noise and improve a transmission quality of a differential mode signal. The passive equalizer can further reduce the magnitude of the excited radiation by suppressing the common mode noise. Furthermore, the transmission line can be implemented by a multi-layer package or printed circuit board processing. For example, the transmission line can be implemented by a circuit board having two metal layers, so as to reduce the manufacturing cost of the transmission line, and to be integrated with the other microwave circuit easy. Furthermore, the passive equalizer formed by the structure of the transmission line is able to operate in two operation modes, and the equivalent circuit of the passive equalizer is also illustrated in the exemplary embodiment of the present disclosure.

An Exemplary Embodiment of the Transmission Line

Figure 1A:
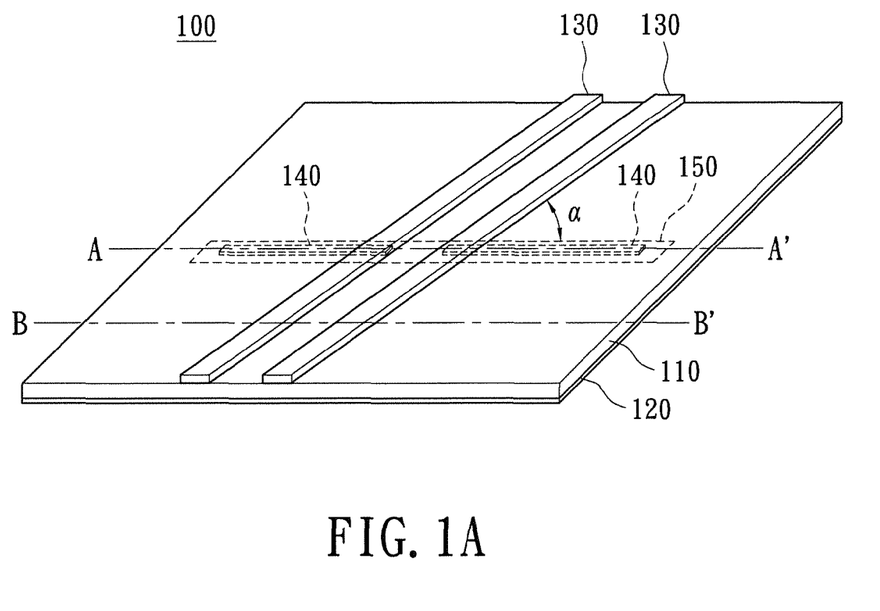
FIG. 1A and FIG. 1B are respectively a three-dimension diagram and a top view diagram of a transmission line according to an exemplary embodiment of the present disclosure.
Figure 1B:
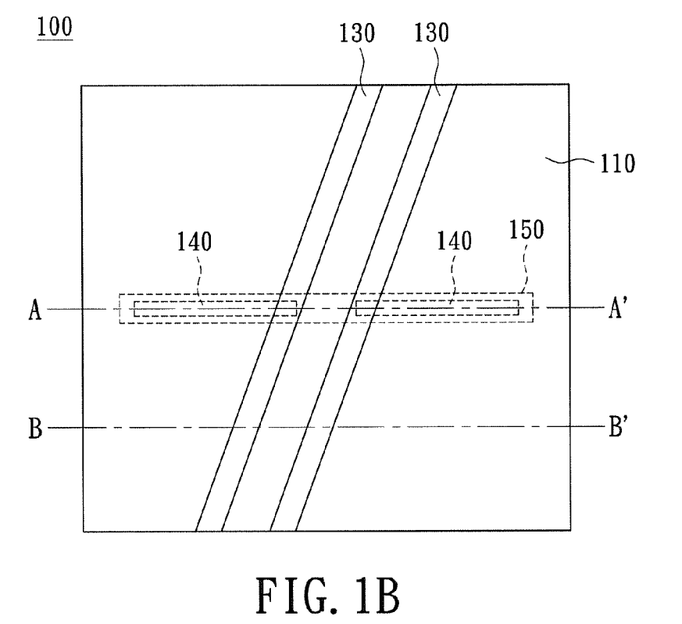
Figure 1C:
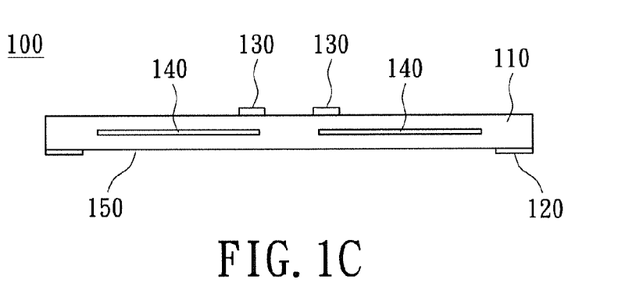
FIG. 1C and FIG. 1D are section view diagrams of the transmission line respectively along with the section lines AA' and BB' according to an exemplary embodiment of the present disclosure.
Figure 1D:
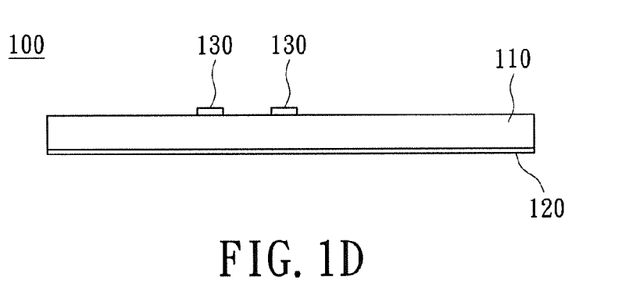

Referring to FIG. 1A through FIG. 1D, FIG. 1A and FIG. 1B are respectively a three-dimension diagram and a top view diagram of a transmission line according to an exemplary embodiment of the present disclosure, and FIG. 1C and FIG. 1D are section view diagrams of the transmission line respectively along with the section lines AA' and BB' according to an exemplary embodiment of the present disclosure. The structure of the transmission line 100 forms a passive equalizer with two operation modes, one of the operation modes is the common signal mode for suppressing the common noise, and the other one of the operation modes is a differential signal mode for improving the transmission quality of the differential mode signal.

The transmission line 100 comprises a substrate 110, a ground plane 120, a pair of transmission conducting lines 130, a pair of stubs 140, and a defect ground structure 150. The substrate 110 has a first surface (the top surface) and a second surface (the bottom surface) being opposite to the first surface. The ground plane 120 is located on the second surface of the substrate 110, and the defect ground structure 150 is formed on the ground plane 120. The pair of the transmission conducting lines 130 is located on the first surface of the substrate 110, and stretching over the defect ground structure 120. The pair of the stubs 140 is located above a plane of the defect ground structure 150, and the stubs 140 are respectively extending along with the two sides of the pair of the transmission conducting line 130. One end of each stub 140 is electrically coupled to the corresponding transmission conducting line 130, and the other end of each stub 140 is electrically coupled to the ground plane 120.

In the exemplary embodiment of the present disclosure, the ground plane 120 is a ground metal plate or plan. The substrate 110 is a single layer or multi-layer substrate made of the material having the good electricity, heat dissipation, and electromagnetic shielding. For example, the substrate 110 is the FR4 substrate. The material and layer number (related to the surface number) of the substrate 110 are not used to limit the present disclosure. In the similar manner, the shape and material of the ground plane 120 is also not used to limit the present disclosure.

It is noted that, the manner that the ground plane 120, the transmission conducting line 130, the stub 140, and the defect ground structure 150 located on the first surface and/or the second surface of the substrate 110 is merely one implementation of the structure of the transmission line in the present disclosure. For example, the ground plane 120, the transmission conducting lines 130, the stubs 140, and the defect ground structure 150 may be located on alternative one surface of the substrate 110. For example, the substrate 110 may be a multi-layer substrate, and thus the ground plane 120, the transmission conducting lines 130, the stubs 140, and the defect ground structure 150 may be located on any one surface of the substrate 110.

In the exemplary embodiment, the defect ground structure 150 is a rectangle defect on the ground plane 120, and the defect ground structure 150 is formed by etching the ground plane 120 or cutting the ground plane 120 by a laser. It is noted that, the forming manner and the shape of the defect ground structure 150 are not used to limit the present disclosure.

In the exemplary embodiment, the pair of the stubs is a pair of metal stubs located in the substrate 110 as shown in FIG. 1C. In addition, the pair of the stubs 140 is a pair of symmetrical stubs substantially. However, it is noted that, the shape, kind, and symmetry of the pair of the stubs 140 are not used to limit the present disclosure. Furthermore, though the transmission line 100 in the exemplary embodiment has a pair of the stubs 140 for electrically connecting to the pair of the transmission conducting lines 130 and the ground plane 120, the present disclosure is not limited thereto. The transmission line 100 may merely has one stub 140 for electrically connecting the pair of the transmission conducting lines 130 and the ground plane 120.

One end of each stub 140 is electrically coupled to the corresponding transmission conducting line 130 through the metal wire, metal via, or the attenuating material (such as the resistor) of the substrate 110. In the similar manner, the other end of each stub is coupled to the ground plane 120 through the metal wire, metal via, or the attenuating material (such as the resistor) of the substrate 110. However, it is noted that, in the other implementation, two ends of each stub 140 are respectively coupled to the corresponding conducting line 130 and the ground plane 120 directly. In short, two ends of each stub 140 are respectively electrically coupled to the corresponding conducting line 130 and the ground plane 120.

For example, the substrate 110 can be a multi-layer substrate having a plurality of surfaces, and transmission conducting lines 130 are located on the $i^{th}$ surface, and each stub 140 is located on the $j^{th}$ surface. One end of each stub 140 on the $j^{th}$ surface is electrically coupled to corresponding transmission conducting line 130 on the $i^{th}$ surface through the metal wire, metal via, or the attenuating material (such as the resistor) of the substrate 110. In the similar manner, the other end of each stub 140 on the $j^{th}$ surface is coupled to the ground plane 120 through the metal wire, metal via, or the attenuating material (such as the resistor) of the substrate 110.

In addition, the stubs 140 of the transmission line 100 may be electrically coupled to the pair of the transmission conducting lines 130 on the $i^{th}$ surface through the same one metal wire, metal via, or attenuating material. In the similar manner, the stubs 140 of the transmission line 100 may be electrically coupled to the ground plane 120 through the same one metal wire, metal via, or attenuating material.

In the exemplary embodiment of the present disclosure, projections of each transmission conducting line 130 and stub 140 on the plane of substrate 110 have an angle α therebetween, wherein the angle α is from 0 through 180 degree. When the angle α is not 90 degree (i.e. projections of the transmission conducting line 130 and the corresponding stub 140 on the plane of substrate 110 are not perpendicular to each other), the locations of the pair of the transmission conducting lines 130 in the section view diagrams of FIG. 1C and FIG. 1D are different from each other.

Another Exemplary Embodiment of a Transmission Line

Figure 2A:
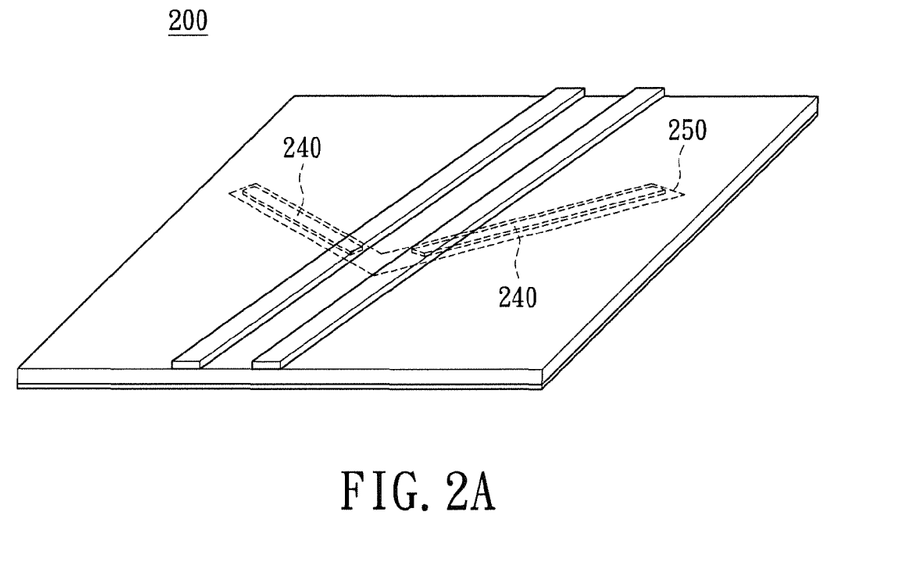
FIG. 2A and FIG. 2B are respectively a three-dimension diagram and a top view diagram of a transmission line according to another exemplary embodiment of the present disclosure.
Figure 2B:
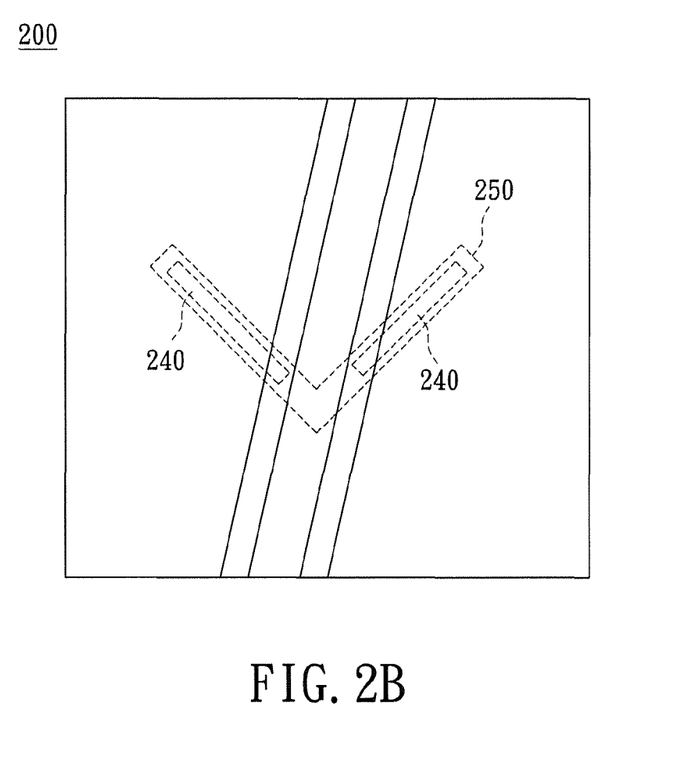

Referring to FIG. 2A and FIG. 2B, FIG. 2A and FIG. 2B are respectively a three-dimension diagram and a top view diagram of a transmission line according to another exemplary embodiment of the present disclosure. Compared to the exemplary embodiment illustrated in FIG. 1A through FIG. 1D, the defect ground structure 250 of the transmission line 200 in the exemplary embodiment in FIG. 2A and FIG. 2B is a irregular shape rather than a rectangle, and the pair of the stubs 250 of the transmission line 200 is not a pair of the symmetrical stubs.

Another Exemplary Embodiment of a Transmission Line

Figure 3A:
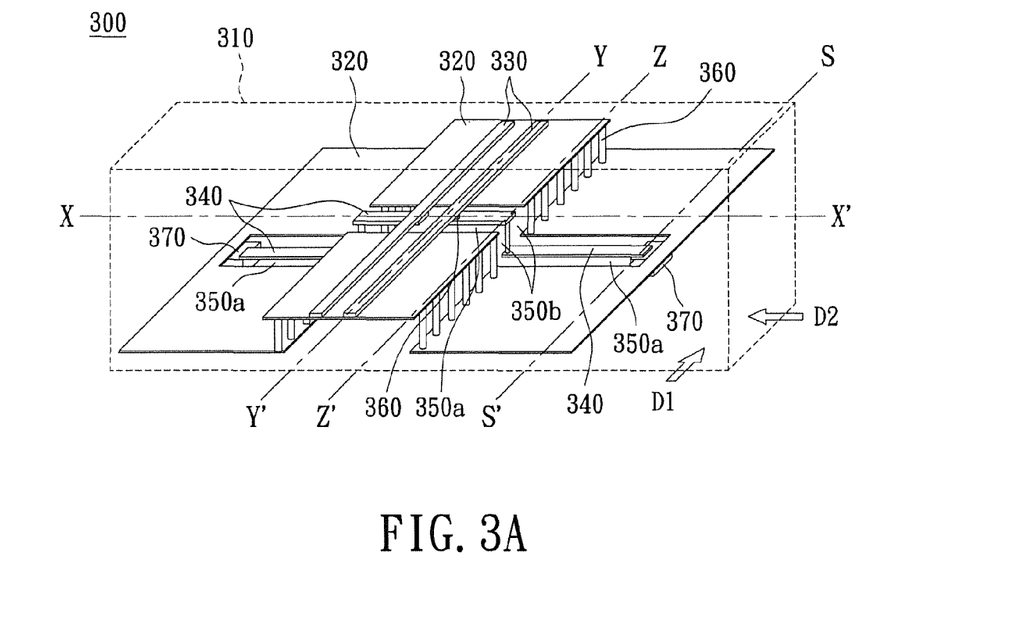
FIG. 3A is a three-dimension diagram of a transmission line according to another exemplary embodiment of the present disclosure.
Figure 3B:
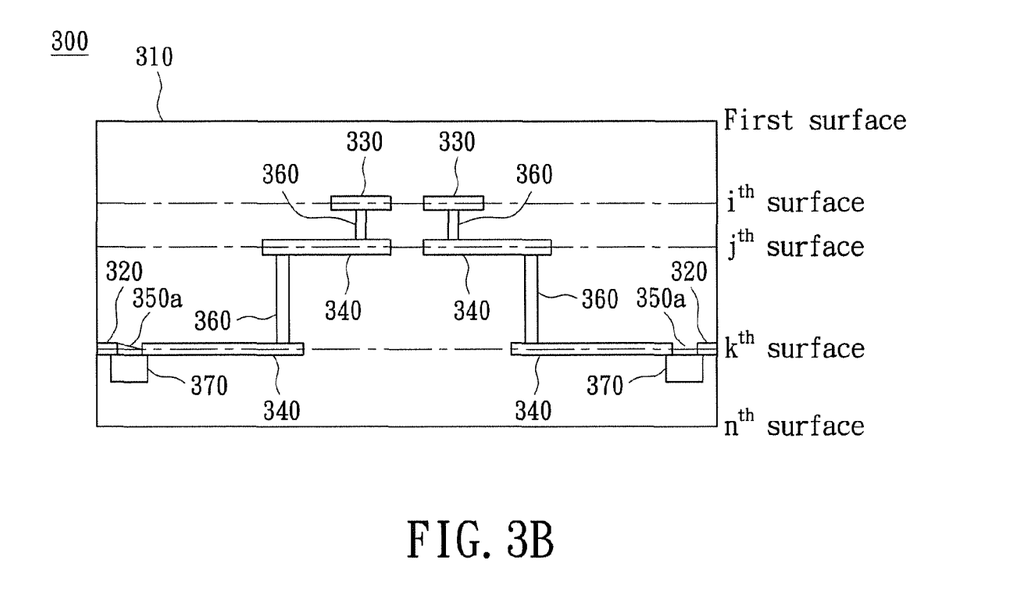
FIG. 3B through FIG. 3E are section view diagrams of the transmission line respectively along with the section lines XX', YY', ZZ', and SS' according to an exemplary embodiment of the present disclosure.
Figure 3C:
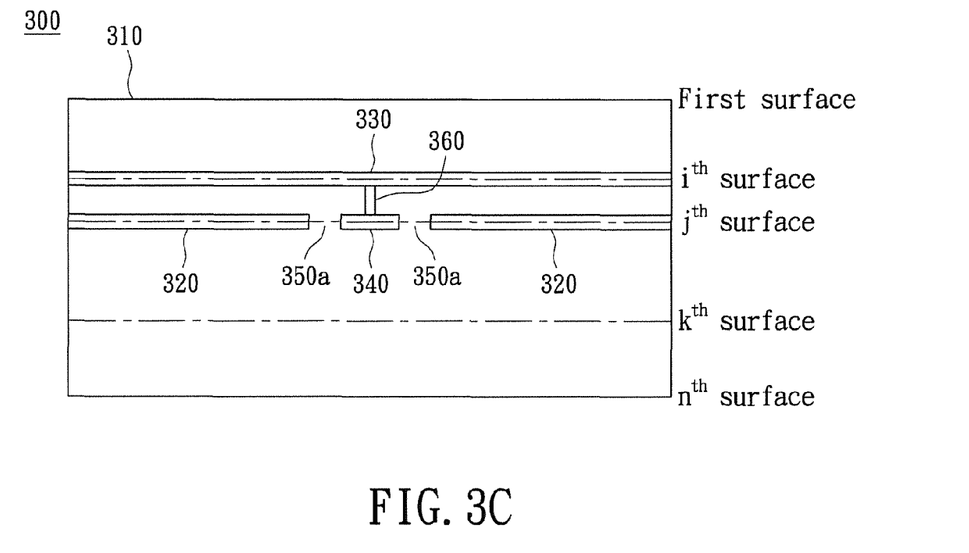
Figure 3D:
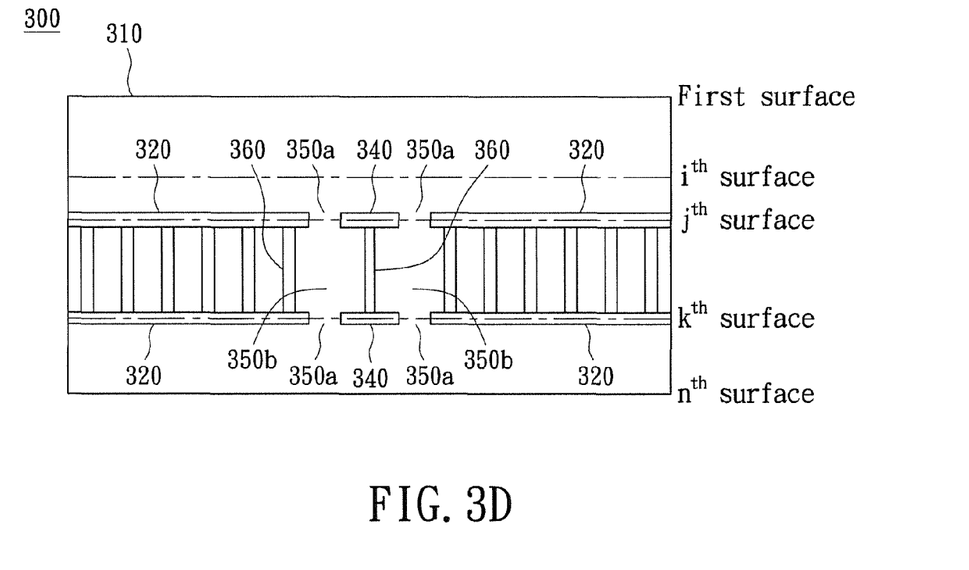
Figure 3E:
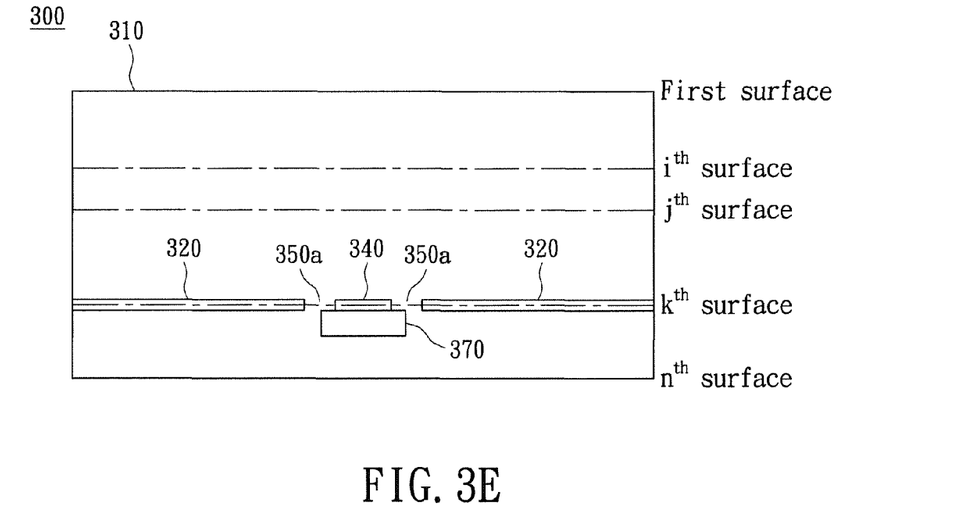
Figure 3F:
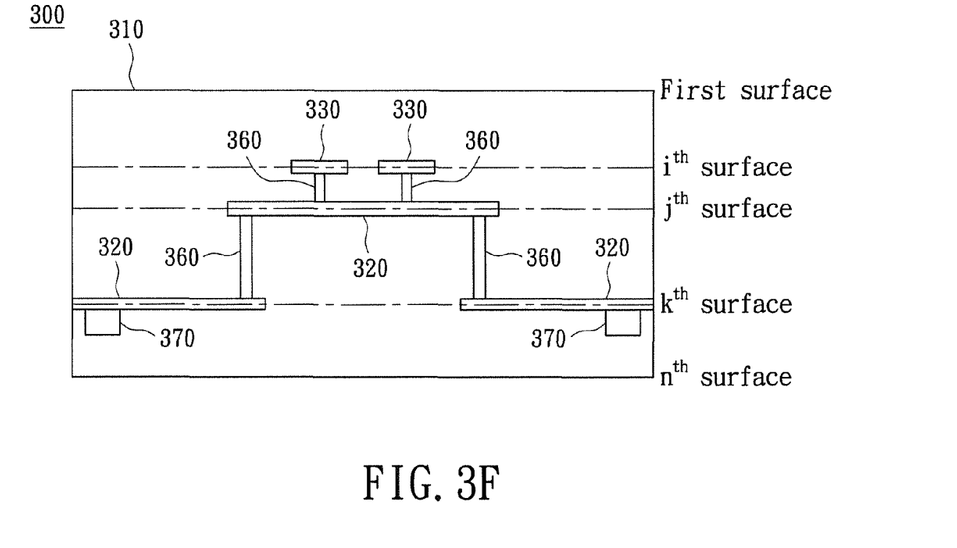
FIG. 3F and FIG. 3G are side view diagrams of the transmission line respectively with the different observation angles according to an exemplary embodiment of the present disclosure.
Figure 3G:
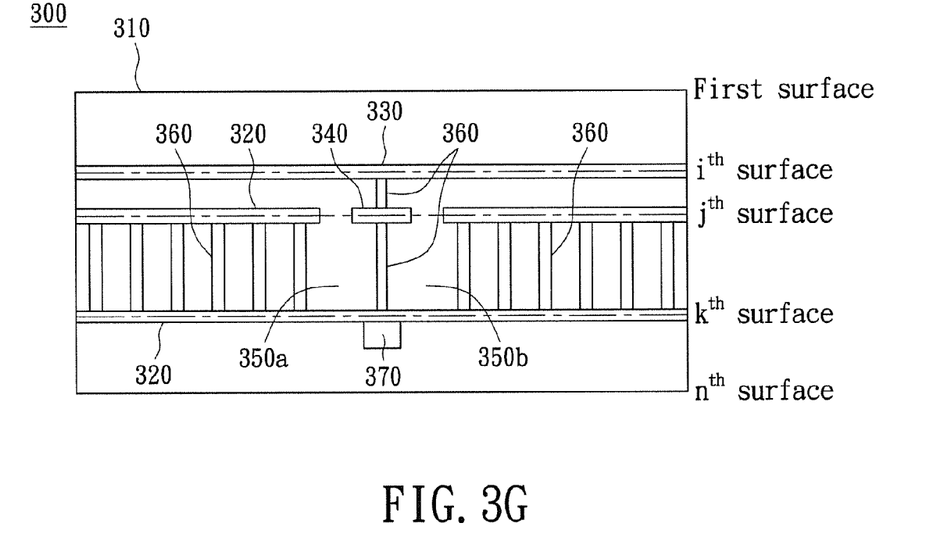

Referring to FIG. 3A through FIG. 3G, FIG. 3A is a three-dimension diagram of a transmission line according to another exemplary embodiment of the present disclosure, FIG. 3B through FIG. 3E are section view diagrams of the transmission line respectively along with the section lines XX', YY', ZZ', and SS' according to an exemplary embodiment of the present disclosure, and FIG. 3F and FIG. 3G are side view diagrams of the transmission line respectively with the different observation angles according to an exemplary embodiment of the present disclosure.

The transmission line 300 comprises a substrate 310, a ground plane 320, a pair of transmission conducting lines 330, a pair of stubs 340, a horizontal defect ground structure 350a, a vertical defect ground structure 350b, a plurality of metal vias 360, and a plurality of resistors 370. In the exemplary embodiments, the substrate 310 is a multi-layer substrate having a plurality of outer and inner surfaces, and these outer and inner surfaces are respectively the first through the $n^{th}$ surfaces.

The pair of the transmission conducting lines 330 is located on the $i^{th}$ surface, and stretching over the three-dimensional defect ground structure formed by the horizontal defect ground structure 350a and vertical defect ground structure 350b. In addition, each of the transmission conducting lines 330 is electrically coupled to the corresponding stub 340 on the $j^{th}$ surface through the metal via 360.

The pair of the stubs 340 is located above a plane of the horizontal defect ground structure 350a, and extending along with the two sides of the pair of the transmission lines 330. In the exemplary embodiment of the present disclosure, the pair of the stubs 340 are formed on the $j^{th}$ and $k^{th}$ surfaces, wherein the part of each stub 340 on the $j^{th}$ surface is electrically coupled to the part of the corresponding stub 340 on the $k^{th}$ surface through the metal via 360. In other words, the pair of the stubs 340 is a pair of three-dimensional stubs 340. In addition, the part of each stub 340 on the $k^{th}$ surface is electrically coupled to the part of the ground plane 320 on the $k^{th}$ surface through the resistor 370.

The ground plane 320 is located on the $k^{th}$ and $j^{th}$ surface, and the part of the ground plane 320 on the $j^{th}$ surface is electrically coupled to the part of the ground plane 320 on the $k^{th}$ surface through the metal vias 360. The part of the of the horizontal defect ground structure 350a on the $j^{th}$ surface is formed on the part of the ground plane 320 on the $j^{th}$ surface, and the part of the of the horizontal defect ground structure 350a on the $k^{th}$ surface is formed on the part of the ground plane 320 on the $k^{th}$ surface. In addition, the vertical defect ground structure 350a is formed between the $i^{th}$ surface and the $k^{th}$ surface.

Be different from the transmission line 100 in FIG. 1A through FIG. 1D, the substrate 300 of the transmission line 300 is a multi-layer substrate, and the defect ground structure is not a planar defect ground structure. In addition, the ground plane 320, the transmission conducting lines 330, the stubs 340, and the resistors 370 can be located on any one inner or outer surface of the substrate 300.

It is known that the shape, structure, and the location surface of the ground plane 320, the transmission conducting lines 330, the stubs 340, the defect ground structure, and the resistors 370 are not used to limit the present disclosure. Moreover, the number and the location manner of the metal vias 360 are also not used to limit the present disclosure.

Another Exemplary Embodiment of a Transmission Line

Figure 4A:
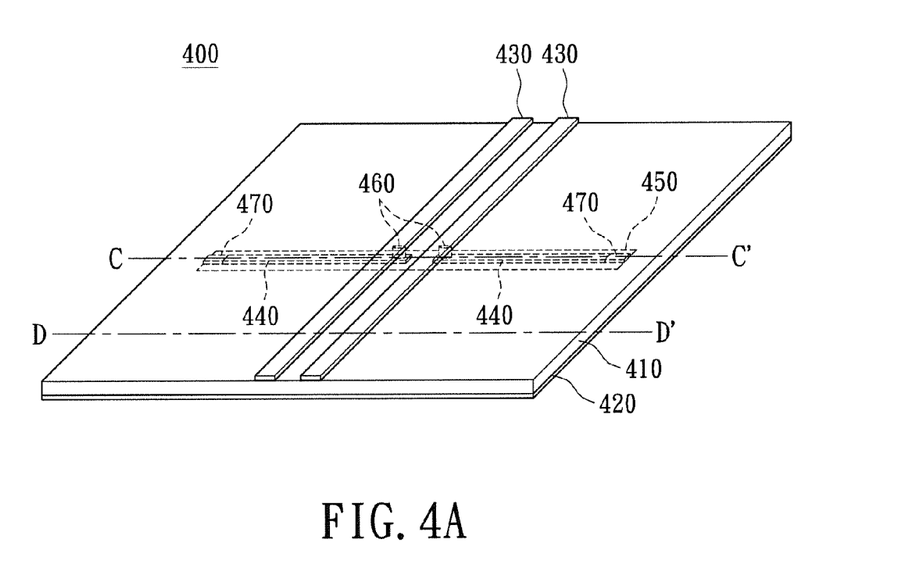
FIG. 4A and FIG. 4B are respectively a three-dimension diagram and a top view diagram of a transmission line according to another exemplary embodiment of the present disclosure.
Figure 4B:
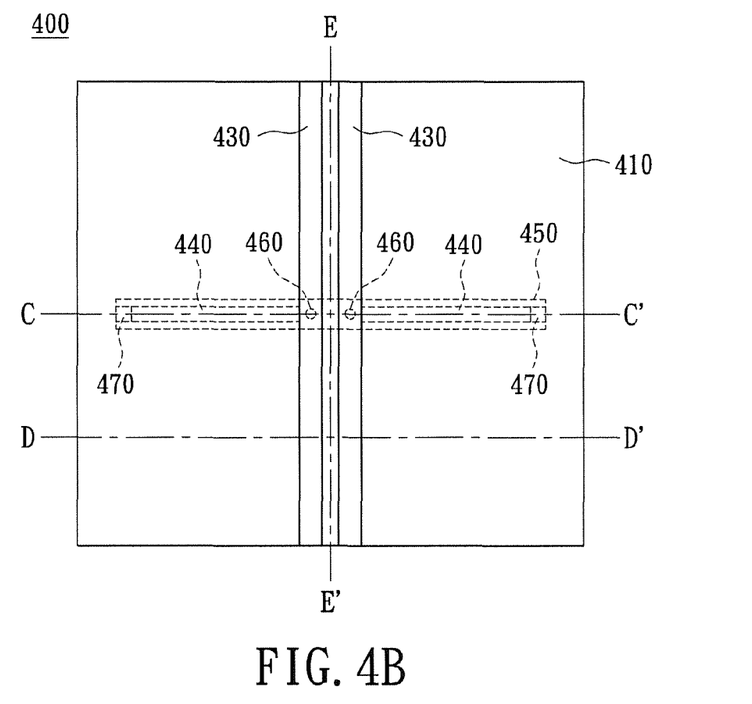
Figure 4C:
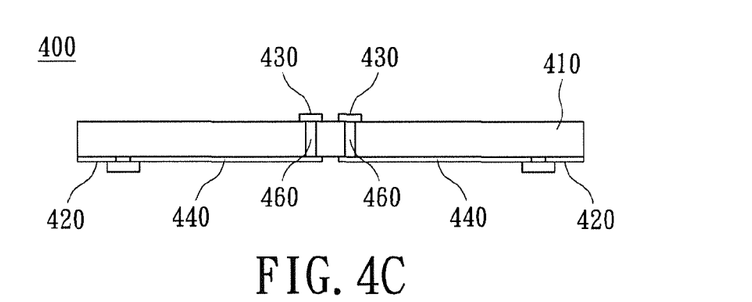
FIG. 4C and FIG. 4D are section view diagrams of the transmission line respectively along with the section lines CC' and DD' according to an exemplary embodiment of the present disclosure.
Figure 4D:
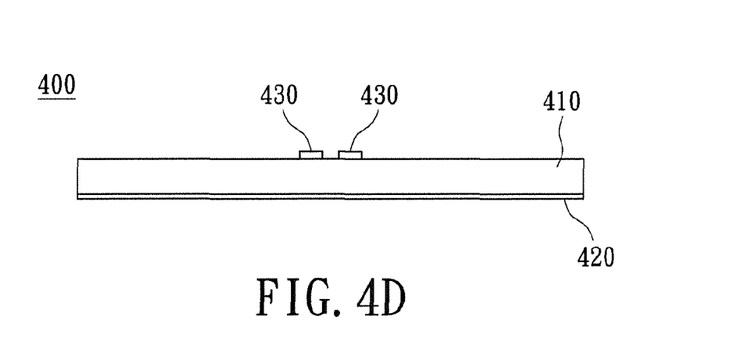

Referring to FIG. 4A through FIG. 4D, FIG. 4A and FIG. 4B are respectively a three-dimension diagram and a top view diagram of a transmission line according to another exemplary embodiment of the present disclosure, and FIG. 4C and FIG. 4D are section view diagrams of the transmission line respectively along with the section lines CC' and DD' according to an exemplary embodiment of the present disclosure. The transmission line 400 comprises a substrate 410, a ground plane 420, a pair of transmission conducting lines 430, a pair of stubs 440, a defect ground structure 450, a plurality of metal vias 460, and a plurality of resistors 470.

Compared to the exemplary embodiment of FIG. 1A through FIG. 1D, in the exemplary embodiment of FIG. 4A through FIG. 4D, the projections of each transmission conducting line 430 and the corresponding stub 440 has angle being 90 degree therebetween. One end of each stub 440 is electrically coupled to the corresponding transmission conducting line 430 through the metal via 460, and the other end of each stub 440 is electrically coupled to the ground plane 420 through the serially connected resistor 470. The pair of the stubs 440 is located on the second surface of the substrate 410. The differential mode impedance of the differential mode signal and the common mode impedance are respectively designed to be 100 and 50 ohm.

In the exemplary embodiment the metal plate is located on the second surface of the substrate 410, and then is etched or cut by the laser, so as to form the ground plane 420, the pair of the stubs 440, and the defect ground structure 450. However, it is noted that, the manner for forming the ground plane 420, the pair of the stubs 440, and the defect ground structure 450 is not used to limit the present disclosure.

In the exemplary embodiment of the present disclosure, the resistors 470 can be the Surface Mounted Device (SMD) resistors. However, the kind and shape of the resistor 470 are not used to limit the present disclosure, and the resistor may be replaced by the other attenuating material.

The pair of the transmission conducting lines 430 are used to receive and transmit the first and second signals, wherein the average value of the first and second signals is called the common mode signal, and the differential value of the first and second signals is called the differential mode signal. Through using the resistor 470 to electrically connect each stub 440 to the ground plane 420, the common mode noise and the low frequency portion of the differential mode signal are suppressed. To sum up, the structure of the transmission line 400 is capable of forming a passive equalizer, and the passive filter is used to filter the common mode noise, and through the attenuation property of the low frequency portion of the differential mode signal, the transmission line 400 forms the passive differential mode signal equalizer to improve the transmission quality of the differential mode signal.

Figure 5A:
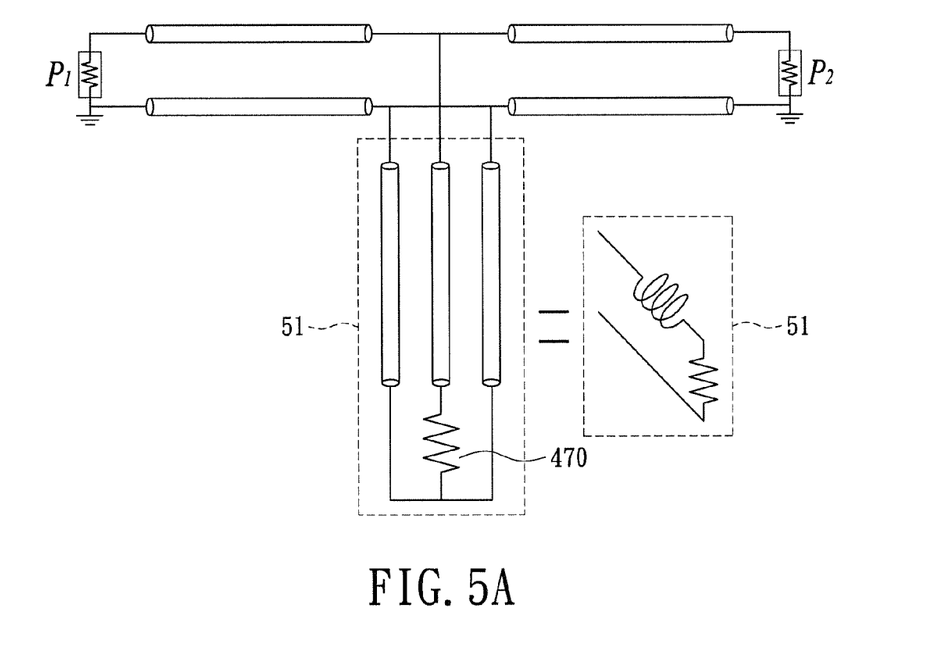
FIG. 5A and FIG. 5B are equivalent circuit diagrams of a transmission line respectively operating in a differential signal mode and a common signal mode by using a half-circuit division along with a mapping plane according to an exemplary embodiment of the present disclosure.
Figure 5B:
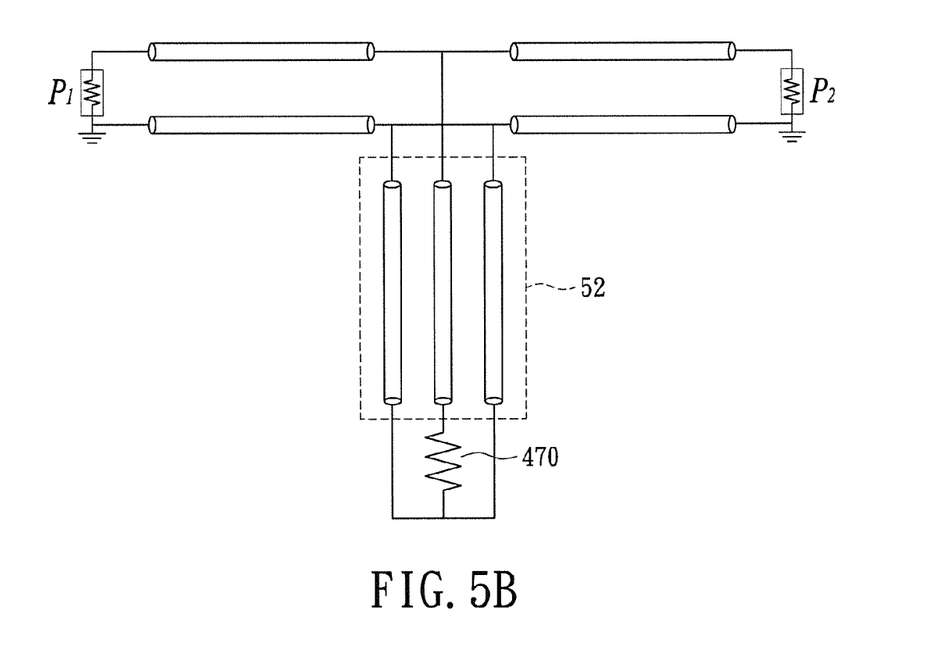

Referring to FIG. 4B, FIG. 5A, and FIG. 5B, FIG. 5A and FIG. 5B are equivalent circuit diagrams of a transmission line respectively operating in a differential signal mode and a common signal mode by using a half-circuit division along with a mapping plane according to an exemplary embodiment of the present disclosure. Due to the symmetry (referring to the symmetrical line EE') of the physical structure of the transmission line 400, a half-circuit division along with a mapping plane on the transmission line 400 is performed under Perfect Electric Conduction (PEC) or Perfect Magnetic Conduction (PMC) condition, so as to obtain the equivalent circuit diagram.

Referring to FIG. 5A, when the differential mode signal is transmitted in the transmission line 400, due to the PEC condition, the two ends of the plane of the defect ground structure 450 in the transmission line 400 can be assumed to be shorting. The stub 440, the two sides of the defect ground structure 450, and the resistor 470 can be equivalent to an equivalent circuit 51 comprising an equivalent capacitor and a resistor 470, and the equivalent capacitor and the resistor 470 are serially connected. Thus, the equivalent circuit in FIG. 5A is substantially a high pass filter with the serially connected capacitor and the resistor 470, so as to compensate the effect of the non-ideal property of the differential mode signal, and improve the transmission quality of the differential mode signal.

Referring to FIG. 5B, when the common mode signal is transmitted in the transmission line 400, the two ends of the plane of the defect ground structure 450 in the transmission line 400 are not shorting. The stub 440 and the two sides of the defect ground structure 450 can be equivalent to an equivalent circuit 52 comprising multiple shunt resistors. Through tuning the resistor values of the resistor 470 and the resistors of the equivalent circuit 52, the equivalent circuit in FIG. 5B is substantially a passive noise filter having a noise filtering bandwidth from DC through several thousands terahertz. Thus, the common mode noise in the common mode signal is dramatically suppressed.

Figure 6A:
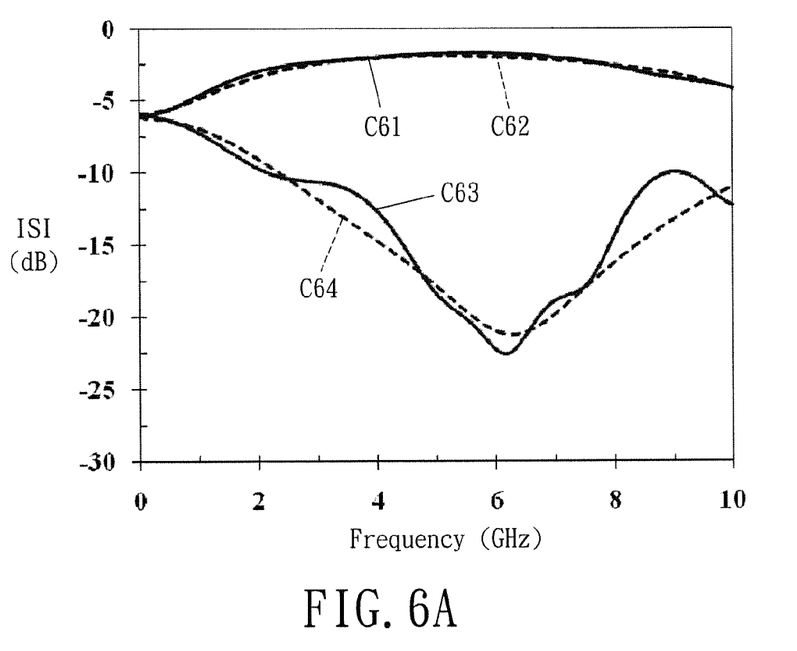
FIG. 6A and FIG. 6B are scattering parameter curve diagrams of a transmission line respectively operating in a differential signal mode and a common signal mode according to an exemplary embodiment of the present disclosure.
Figure 6B:
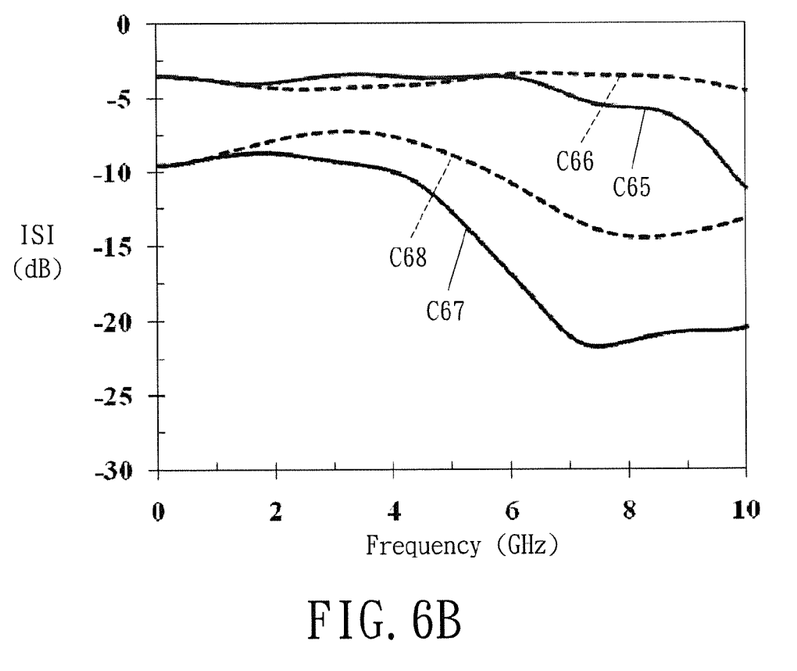

Referring to FIG. 5A and FIG. 6A, FIG. 6A and FIG. 6B is a scattering parameter (S parameter) curve diagram of a transmission line operating in a differential signal mode according to an exemplary embodiment of the present disclosure. The values of the parameter $|S_{11}|$ of the differential mode signal at the port P1 corresponding to different frequencies are shown by curves C61 and C62, wherein the curve C61 is a result of full wave simulation, and the curve C62 is a result of the simulation by using the equivalent circuit mode. In addition, the values of the parameter $|S_{21}|$ of the differential mode signal from the port P1 to the port P2 corresponding to different frequencies are shown by curves C63 and C64, wherein the curve C63 is a result of full wave simulation, and the curve C64 is a result of the simulation by using the equivalent circuit mode.

Referring to FIG. 5B and FIG. 6B, FIG. 6B and FIG. 6B is a scattering parameter (S parameter) curve diagram of a transmission line operating in a common signal mode according to an exemplary embodiment of the present disclosure. The values of the parameter $|S_{11}|$ of the common mode signal at the port P1 corresponding to different frequencies are shown by curves C65 and C66, wherein the curve C65 is a result of full wave simulation, and the curve C66 is a result of the simulation by using the equivalent circuit mode. In addition, the values of the parameter $|S_{21}|$ 1 of the common mode signal from the port P1 to the port P2 corresponding to different frequencies are shown by curves C67 and C68, wherein the curve C67 is a result of full wave simulation, and the curve C68 is a result of the simulation by using the equivalent circuit mode.

Figure 7:
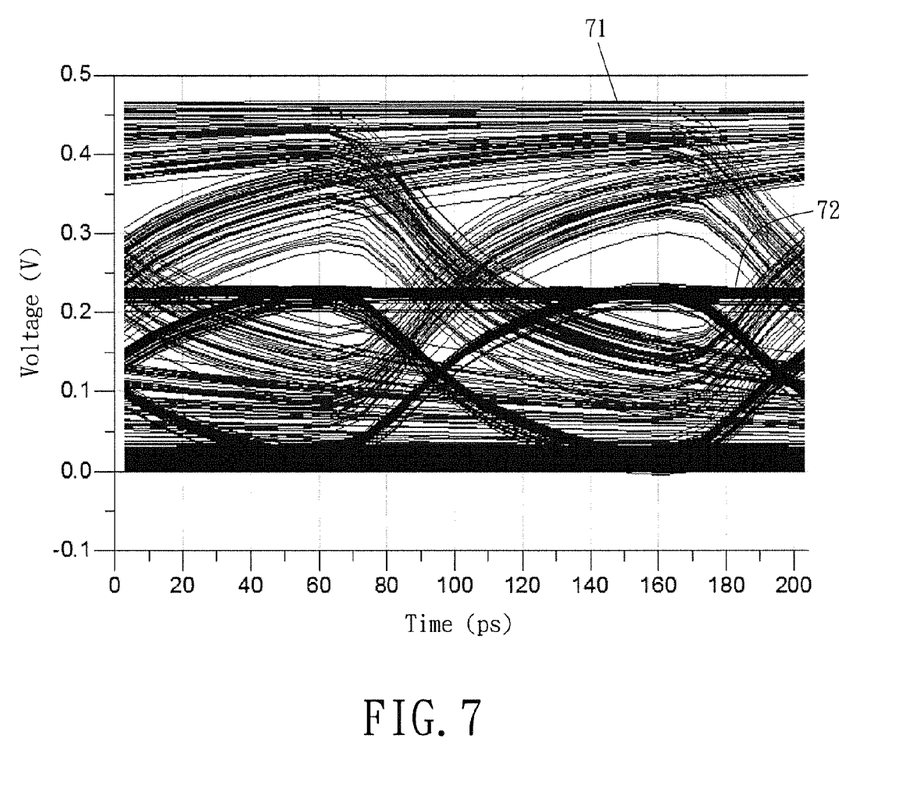
FIG. 7 is an eye pattern diagram of a differential signal in a conventional transmission line and a transmission line according to an exemplary embodiment of the present disclosure.

Referring to FIG. 7, FIG. 7 is an eye pattern diagram of a differential signal in a conventional transmission line and a transmission line according to an exemplary embodiment of the present disclosure. Compared to the eye pattern form by the waveform 71 of the differential mode signal transmitted in the conventional transmission line, the eye pattern form by the waveform 72 of the differential mode signal transmitted in the transmission line provided in the exemplary embodiment of the present disclosure is better. Thus, from FIG. 6A, FIG. 6B, and FIG. 7, the transmission line 400 provided in the exemplary embodiment of the present disclosure can suppress the common mode noise and improve the transmission quality of the differential mode signal.

It is noted that, though the description merely illustrates the performance comparison of the transmission line 400 and the conventional transmission line, it is not intended to state the design of the transmission line is the preferred and best exemplary embodiment, and the design of the transmission line 400 is not used to limit the present disclosure.

Another Exemplary Embodiment of an Electrical Apparatus

The transmission lines mentioned above can be adopted in the electrical apparatus. The electrical apparatus comprises a plurality of electrical components and at least one transmission line as mentioned above. The electrical components for example are the two electrical chips, and the two electrical chips are electrically coupled to each other through the transmission line mentioned above. In short, the transmission line is used to electrically couple to at least one of the electrical components.

Possible Advantages of the Exemplary Embodiments of the Transmission Lines

To sum up, the exemplary embodiment of the present disclosure provides a transmission line, the transmission properties of the transmission line for the differential mode signal and common mode signal are illustrated above. From the above illustration, the transmission line has a structure forming a passive equalizer, and the passive equalizer is able to suppress the common mode noise and improve the transmission quality of the differential signal. Moreover, the transmission line can suppress the common mode noise and improve the transmission quality of the differential signal without needing the extra power consumption and the extra chip. Thus, the chip area and the circuit board area of the electrical apparatus adopting the transmission line can be reduced, and the power consumption the electrical apparatus can be also reduced. The transmission line can be applied in the currently marketed electrical apparatuses of different kinds, and thus the electrical apparatuses have the lower manufacturing cost, the lower power consumption, and the thin and slim dimension.

In order to further understand the techniques, means and effects the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

What is claimed is:

1. A transmission line with a structure which is capable of forming a passive equalizer, comprising:
   a substrate, having a plurality of surfaces;
   a ground plane, located on at least one of the surfaces;
   a defect ground structure, formed on the ground plane;
   a pair of transmission conducting lines, located on one of the surfaces, and stretching over the defect ground structure; and
   at least one stub, located above a plane of the defect ground structure, extending along with at least one side of two sides of the pair of the transmission conducting lines, and electrically coupled to the pair of the transmission conducting lines and the ground plane.

2. The transmission line according to claim 1, wherein the defect ground structure is formed by etching the ground plane or cutting the ground plane through a laser.

3. The transmission line according to claim 1, wherein the substrate is a single layer substrate or a multi-layer substrate.

4. The transmission line according to claim 1, wherein the defect ground structure comprises at least one horizontal defect ground structure.

5. The transmission line according to claim 1, further comprising:
   at least one metal via, wherein one end of the stub is electrically coupled to the corresponding transmission conducting line through the metal via.

6. The transmission line according to claim 1, further comprising:
   at least one attenuating material, wherein one end of the stub is electrically coupled to the ground plane through the attenuating material.

7. The transmission line according to claim 6, wherein the attenuating material is a resistor.

8. The transmission line according to claim 1, wherein the at least one stub is a pair of stubs, wherein one end of each of the stubs is electrically coupled to the ground plane, and another end of each of the stubs is electrically coupled to the corresponding transmission conducting line.

9. The transmission line according to claim 8, wherein the pair of the stubs is a pair of symmetrical stubs, the pair of the transmission conducting line is a pair of symmetrical transmission conducting lines, and a projection of the pair of the transmission conducting lines on a plane of the substrate is perpendicular to a projection of the pair of the stubs on the plane of the substrate.

10. An electrical apparatus, comprising:
    a plurality of electrical components; and
    at least one transmission line, for electrically connecting at least one of the electrical components, having a structure which is capable of forming a passive equalizer, and comprising:
    a substrate, having a plurality of surfaces;
    a ground plane, located on at least one of the surfaces;
    a defect ground structure, formed on the ground plane;
    a pair of transmission conducting lines, located on one of the surfaces, and stretching over the defect ground structure; and
    at least one stub, located above a plane of the defect ground structure, extending along with at least one side of two sides of the pair of the transmission conducting lines, and electrically coupled to the pair of the transmission conducting lines and the ground plane.

11. The electrical apparatus according to claim 10, wherein the transmission line further comprising:
    at least one attenuating material, wherein one end of the stub is electrically coupled to the ground plane through the attenuating material.

12. The electrical apparatus according to claim 10, wherein the substrate is a single layer substrate or a multi-layer substrate.

13. The electrical apparatus according to claim 10, wherein the defect ground structure comprises at least one horizontal defect ground structure.

14. The electrical apparatus according to claim 10, wherein the transmission line further comprising:
    at least one metal via, wherein one end of the stub is electrically coupled to the corresponding transmission conducting line through the metal via.

15. The electrical apparatus according to claim 10, wherein the at least one stub is a pair of stubs, wherein one end of each of the stubs is electrically coupled to the ground plane, and another end of each of the stubs is electrically coupled to the corresponding transmission conducting line.

16. The electrical apparatus according to claim 15, wherein the pair of the stubs is a pair of symmetrical stubs, the pair of the transmission conducting line is a pair of symmetrical transmission conducting lines, and a projection of the pair of the transmission conducting lines on a plane of the substrate is perpendicular to a projection of the pair of the stubs on the plane of the substrate.

17. A transmission line, comprising:
    a passive equalizer, receiving and transmitting a first signal and a second signal, wherein the passive equalizer is operating in a first operation mode for a differential mode signal of the first signal and the second signal, so as to improve a transmission quality of the differential mode signal, and the passive equalizer is operating in a second operation mode for a common mode signal of the first signal and the second signal, so as to filter a common mode noise.

18. The transmission line according to claim 17, wherein when the passive equalizer is operated in the first operation mode, the passive equalizer is equivalent to a passive high pass filter, and when the passive equalizer is operated in the second operation mode, he passive equalizer is equivalent to a passive noise filter.

19. The transmission line according to claim 18, wherein the passive high pass filter is an equivalent circuit having a resistor and a inductor serially connected.

20. The transmission line according to claim 18, wherein the passive noise filter has a noise filtering bandwidth from DC through several thousands terahertz.

* * * * *